United States Patent
Chabanas et al.

(10) Patent No.: US 6,761,524 B2
(45) Date of Patent: Jul. 13, 2004

(54) LOADHANDLING EQUIPMENT AND VEHICLE INCORPORATING IT

(75) Inventors: Noël Chabanas, Le Chambon Feugerolles (FR); Thierry Goiran, Bonson (FR)

(73) Assignee: Marrel, Andrezieux-Boutheon (FR)

( * ) Notice: Subject to any disclaimer, the term of this patent is extended or adjusted under 35 U.S.C. 154(b) by 80 days.

(21) Appl. No.: 10/101,530

(22) Filed: Mar. 20, 2002

(65) Prior Publication Data

US 2002/0150454 A1 Oct. 17, 2002

(30) Foreign Application Priority Data

Mar. 21, 2001 (FR) .............................................. 01 03818

(51) Int. Cl.[7] .............................. B60P 1/64; B62D 53/08
(52) U.S. Cl. .................... 414/491; 414/498; 414/546
(58) Field of Search ................................ 414/498, 491, 414/546

(56) References Cited

U.S. PATENT DOCUMENTS

| | | | |
|---|---|---|---|
| 3,825,137 A | | 7/1974 | Mackrill et al. |
| 3,878,948 A | | 4/1975 | Corompt |
| 4,147,266 A | | 4/1979 | Corompt |
| 4,652,201 A | | 3/1987 | Boughton |
| 5,290,138 A | | 3/1994 | Smart et al. |
| 5,531,559 A | * | 7/1996 | Kruzick ....................... 414/498 |
| 5,542,808 A | * | 8/1996 | Chiron et al. ................ 414/498 |
| 5,597,281 A | * | 1/1997 | Croiset et al. ............... 414/498 |
| 5,601,393 A | * | 2/1997 | Waldschmitt ................ 414/498 |
| 5,678,978 A | * | 10/1997 | Markham .................... 414/477 |
| 5,967,735 A | | 10/1999 | Smart et al. |
| 6,092,863 A | * | 7/2000 | Hagenbuch et al. ......... 296/184 |
| 6,158,947 A | * | 12/2000 | Goiran et al. ................ 414/500 |
| 6,206,476 B1 | * | 3/2001 | Welton ........................ 298/1 B |
| 6,406,247 B1 | * | 6/2002 | Ghiretti et al. .............. 414/498 |
| 6,558,104 B1 | * | 5/2003 | Vlaanderen et al. ......... 414/498 |

FOREIGN PATENT DOCUMENTS

| | | |
|---|---|---|
| DE | 7718760 | 10/1977 |
| DE | 2704493 A1 | 8/1978 |
| DE | 4337422 A1 | 5/1995 |
| EP | 1063122 A1 | 12/2000 |
| FR | 2109109 | 10/1970 |
| FR | 2169810 | 12/1972 |
| GB | 1327928 | 8/1973 |
| WO | 9014250 | 11/1990 |

OTHER PUBLICATIONS

International Search Report.

* cited by examiner

*Primary Examiner*—Douglas Hess
(74) *Attorney, Agent, or Firm*—Crowell & Moring LLP

(57) ABSTRACT

Loadhandling equipment enables a vehicle to put down on the ground or pick up a load such as a dumpster and to tip the load, which is provided on a front face with a lifting bar. The equipment includes a deformable and tilting handling arm which can assume, in addition to a transport position and a putting down on the ground or picking up position, a tipping position in which a hook interengages with the lifting bar on the load on being pivoted by a tilting actuator about a transverse pivot axis at the rear of the equipment and spaced downwardly from the longitudinal section of the handling arm. The transverse rear pivot axis is behind and under the side members of the chassis frame of the vehicle and the frame of the equipment has an L-shaped profile with a first branch on top of the side members of the chassis frame. An upper portion of the second branch is against the rear of the side members.

22 Claims, 7 Drawing Sheets

LOADHANDLING EQUIPMENT AND VEHICLE INCORPORATING IT

This application claims the priority of French Patent Document No. 0103818, filed Mar. 21, 2001, the disclosure of which is expressly incorporated by reference herein.

BACKGROUND OF THE INVENTION

1. Field of the Invention

The invention relates to equipment enabling a vehicle to manipulate a load such as a dumpster provided with a lifting bar on its front face.

2. Description of the Prior Art

Loadhandling equipment that includes a deformable and tilting handling arm provided at one end with a hook adapted to be interengaged with the lifting bar on the load is known in the art, in particular from patent application FR 2 109 109 A. In a transport position, the handling arm has a front section disposed at the front end of the equipment and oriented vertically or substantially vertically with the hook at the top and a longitudinal section oriented horizontally or substantially horizontally with a first end connected to the base of the front section and a second end adapted to be articulated to the rear of the vehicle about a transverse pivot axis. The longitudinal section is formed by a link having a first end articulated about the transverse rear pivot axis and by a first branch of a bracket, whose second branch forms the front section. The first branch of the bracket has its end opposite the front section articulated to the second end of the link about a transverse intermediate pivot axis. The first branch of the bracket is telescopic and has a deployed position in which its length is a maximum and a retracted position in which its length is a minimum. The first branch is deployed in the transport position mentioned above. In addition to this position, the handling arm can assume:

a putting down on the ground or picking up position, in which the hook is to the rear of the vehicle at a height enabling it to be interengaged with or released from the lifting bar of a load of the type mentioned above, resting on the ground, the movement between the transport position and the putting down on the ground or picking up position being effected initially by the movement of the first branch of the bracket from its deployed position to its retracted position, followed by pivoting of the bracket by a tilting actuator about its articulation with the link, the latter remaining fixed; and a tipping position, to which the hook moves from the transport position by being pivoted upwardly and rearwardly about the transverse rear pivot axis by the tilting actuator, the arm retaining during this pivoting movement the same configuration as in the transport position.

Also known in the art are variants of the arrangement of the longitudinal section of the arm and the manner in which it is deformed between the transport position and the putting down on the ground or picking up position, in particular as disclosed in U.S. Pat. No. 3,878,948, in which the bracket pivots relative to the link until it reaches a predetermined angle, from which it is abutted against the link, these two members then pivoting together about the transverse rear pivot axis, or as disclosed in patent application FR 2 169 810 A, in which the telescopic first branch of the bracket is replaced by a front end portion of the first branch that can be raised to retract the hook. Some equipment combines a bracket and a link operating as described in U.S. Pat. No. 3,878,948 with a bracket whose first branch is telescopic and/or has an end portion that can be raised, respectively as described in the document FR 2 109 109 A and in the document FR 2 169 810 A.

The invention aims to provide equipment of the same kind but which is more convenient and more economic.

SUMMARY OF THE INVENTION

To this end the invention proposes equipment enabling a vehicle to put down on the ground or to pick up a load such as a dumpster and to tip the load, which has a lifting bar on a front face, the equipment including a deformable and tilting handling arm provided at one end with a hook adapted to interengage with the lifting bar of the load and adapted to assume the following positions:

a transport position in which a front section is disposed at the front end of the equipment and oriented vertically or substantially vertically with the hook at the top and a longitudinal section is disposed to the rear of the front section and oriented horizontally or substantially horizontally with the front end of the longitudinal section connected to the base of the front section;

a putting down on the ground or picking up position in which the hook is to the rear of the vehicle at a height enabling it to be interengaged with or released from the lifting bar of the load resting on the ground; and a tipping position to which the hook moves from the transport position by being pivoting upwardly and rearwardly by a tilting actuator about a transverse pivot axis situated to the rear of the equipment;

in which equipment the transverse rear pivot axis is downwardly spaced from the longitudinal section of the handling arm.

This offset, which does not exist in conventional equipment, where the pivot axis is at the rear end of the longitudinal section, offers the advantage of being able to use a tilting actuator having both a small section and a small inclination to the horizontal in the transport position.

The height of the portion of the equipment in accordance with the invention that is below the load can therefore be smaller than in conventional equipment. A vehicle equipped with equipment according to the invention therefore handles better when transporting a load because its overall center of gravity is lower, with the additional benefit of a reduction in the height of obstacles under which it can pass.

What is more, for the same flowrate from the hydraulic power unit, the smaller section of the tilting actuator produces a higher speed and thus saves time in handling a load.

The reason why the offset proposed by the invention between the longitudinal section of the handling arm and the transverse rear pivot axis minimizes both the section and the inclination of the tilting actuator is that, in the transport position, in which, because of overall size constraints, the tilting actuator must be at substantially the same level as the longitudinal section of the handling arm, this offset enables the actuator to have a long lever arm with respect to the transverse rear pivot axis when its inclination to the horizontal, and to be more precise, its upward and rearward inclination, is particularly small.

Note that in conventional equipment either the tilting actuator has a small inclination, so that there is only a short lever arm and it is necessary to employ a powerful and therefore large-diameter actuator, consequently increasing the height of the equipment, or, to use an actuator of smaller section, the actuator has a relatively large inclination, which also increases the height of the equipment.

The offset proposed by the invention between the longitudinal section of the handling arm and the transverse rear pivot axis also offers the advantage of enabling the rear of the vehicle to be fitted with an underride guard that projects a relatively great distance toward the rear without constituting an obstacle to the load on moving from the transport position to the tipping position.

This is because, during this movement, each point on the longitudinal section of the handling arm follows a circular arc trajectory centered on the transverse rear pivot axis, which is spaced from that longitudinal section, so that the latter not only performs an upward and rearward tilting movement, but also an offsetting movement, in particular toward the rear, thanks to which the underride guard can be placed further to the rear than in conventional equipment in which the load does not perform any such offsetting movement.

In accordance with preferred features, the handling arm has a rear section which, in the transport position, is disposed to the rear of the longitudinal section and oriented vertically or substantially vertically with the top of the rear section connected to the rear of the longitudinal section, the means for articulation of the arm about the transverse rear pivot axis being disposed at the base of the rear section.

Providing a rear section of this kind is of particular practical benefit for implementing the invention.

A rear section of this kind can easily be disposed to the rear of the chassis frame of the vehicle, for example.

Note that in this case, the transverse rear pivot axis is further to the rear than the chassis frame of the vehicle, and therefore further to the rear than would be the corresponding axis of conventional equipment, which increases the lever arm available to the tilting actuator and the possibility of positioning toward the rear an underride guard, if any.

The handling arm preferably has at the junction between the longitudinal section and the rear section two rollers adapted to support respective longitudinal rails situated on a righthand side and a lefthand side of a bottom face of the load.

Because these support rollers are part of the handling arm, they also pivot about the transverse rear pivot axis on movement from the transport position to the tipping position.

This offers the advantage, compared to a solution in which the rollers are fixed, that there is no need for a member for supporting the rear end of the load to take over from the rollers during movement from the transport position to the tipping position.

In accordance with other preferred features, the equipment includes a frame having an L-shaped profile, a first branch of which is adapted to come onto the chassis frame of the vehicle and whose second branch projects downward from the first branch and includes means for articulating the handling arm about the transverse rear pivot axis.

A frame of this kind makes it particularly convenient to implement the invention, and in particular enables the equipment to be installed simply by fixing the frame to the chassis frame of the vehicle.

Note also, and most importantly, that any accessories to be disposed at the rear of the vehicle, and in particular an underride guard or a strut that comes into contact with the ground, can be mounted directly on the second branch of the frame, i.e. directly on the equipment itself, which saves time when installing the equipment on the vehicle, compared to conventional equipment where these accessories must be fixed to the chassis frame of the vehicle after fixing the frame of the equipment to the chassis frame.

A second aspect of the invention provides a vehicle equipped with the equipment described above, with its transverse rear pivot axis to the rear of and lower than the side members of the chassis frame of the vehicle.

The invention also provides a vehicle equipped with equipment as described above having a frame with an L-shaped profile in which the first branch of the frame is on top of the side members of the chassis frame of the vehicle and the upper portion of the second branch is against the rear of said side members of the chassis frame.

Preferably, for reasons of simplicity, convenience and economy:

there is a chamfer between an upper face and a rear face of the side members, the chamfer being flanked by a junction between the branches of the frame; and/or an angle-bracket disposed between a side member and a leg of the frame is fixed to a lateral wall of a side member of the chassis frame of the vehicle.

The disclosure of the invention continues now with the following description of embodiments of the invention, which description is given by way of illustrative and non-limiting example only and with reference to the accompanying drawings.

DETAILED DESCRIPTION OF THE PREFERRED EMBODIMENTS

Figure 1:
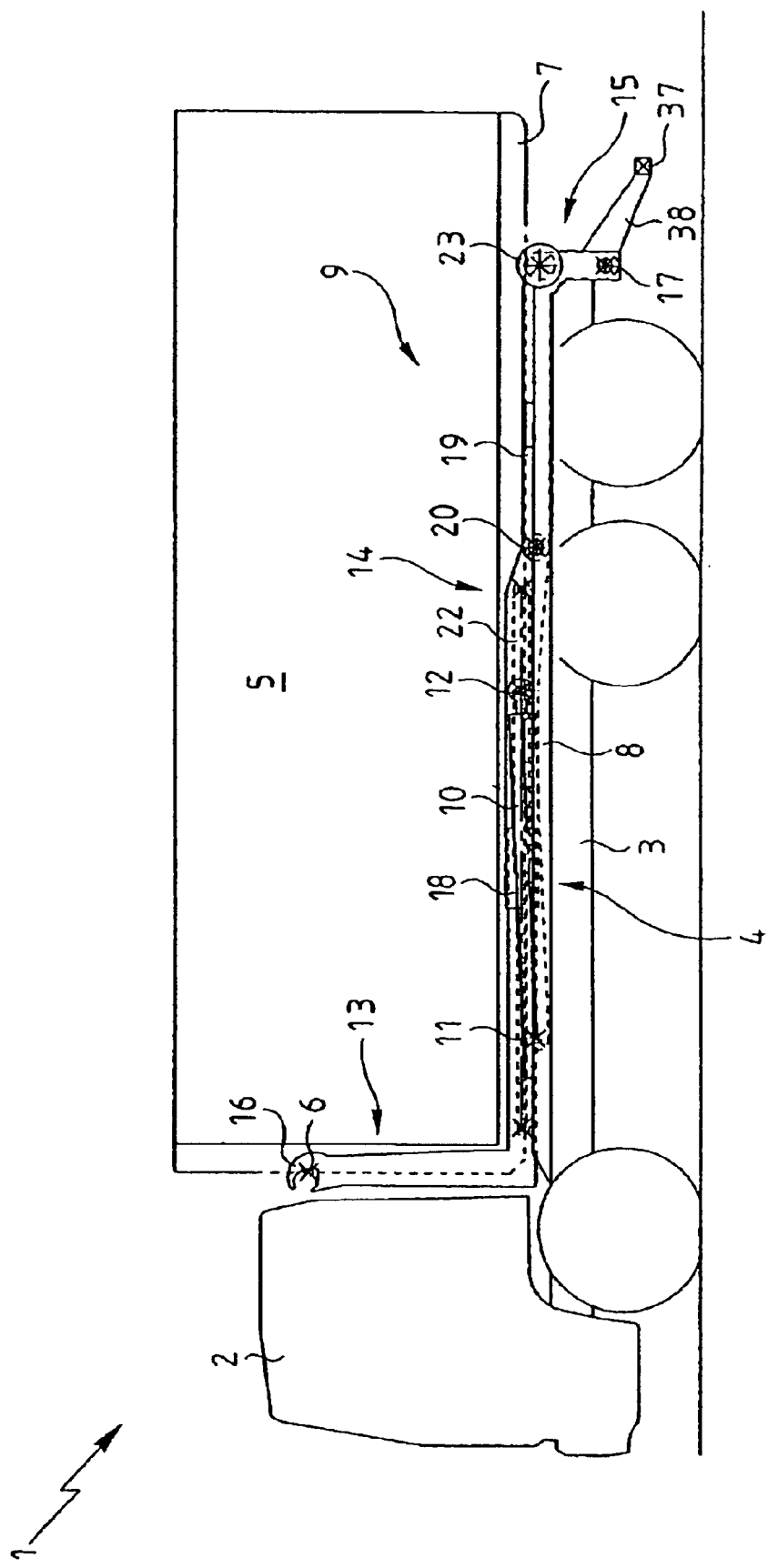
FIG. 1 is an elevation view from the lefthand side of a vehicle equipped with equipment according to the invention, shown in a transport position.

The truck 1 shown in the drawings includes, behind a cab 2, a load-bearing chassis frame 3 on which is mounted equipment 4 according to the invention for manipulating a load such as a dumpster 5, which is provided in a manner that is well known in the art (for example as specified in the French AFNOR standard NF R 17-108 and the German DIN standard 30722) a lifting bar 6 on its front face and a respective longitudinal rail 7 on each of the righthand and lefthand sides of its bottom face.

Figure 4:
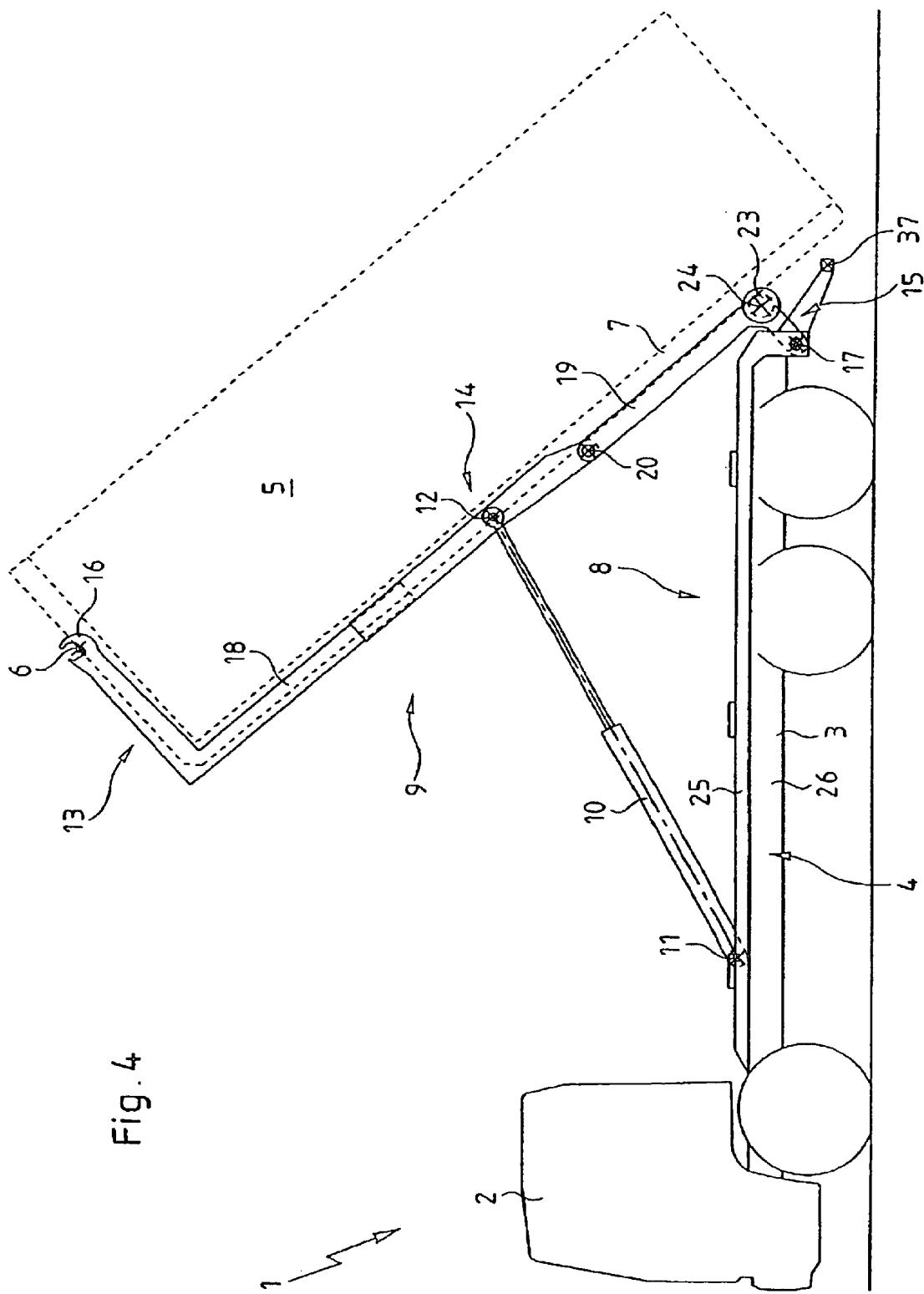

As can be seen more clearly in FIG. 4, the equipment 4 includes a frame 8 fixed to the chassis frame 3, a handling arm 9 mounted on the frame 8, and a tilting actuator 10 whose front end is articulated to the frame 8 about a transverse pivot axis 11 and whose rear end is articulated to the arm 9 about a transverse articulation axis 12.

The handling arm 9 has a front section 13, a longitudinal section 14, and a rear section 15.

In a transport position (see FIG. 1), the front section 13 is disposed at the front end of the equipment and is oriented vertically or substantially vertically with a hook 16 adapted to be interengaged with the lifting bar 6 of the load 5 at the top. In this transport position, the longitudinal section 14 is disposed to the rear of the front section 13 and oriented horizontally or practically horizontally with its front end connected to the base of the section 13. In the transport position, the rear section 15 is disposed to the rear of the longitudinal section 14 and oriented vertically or practically vertically with its top connected to the rear of the section 14 and its base articulated to the frame 8 about a rear pivot axis 17.

The arm 9 is formed by a bracket 18 and a link 19.

The bracket 18 has two branches, one of which forms the front section 13 and the other of which is part of the longitudinal section 14, the end of the second branch opposite the front section 13 being articulated to the front end of the link 19 about a transverse pivot axis 20. The articulation axis 12 between the actuator 10 and the longitudinal section 14 of the arm 9 is on the second branch, not far from the axis 20.

Figure 2:
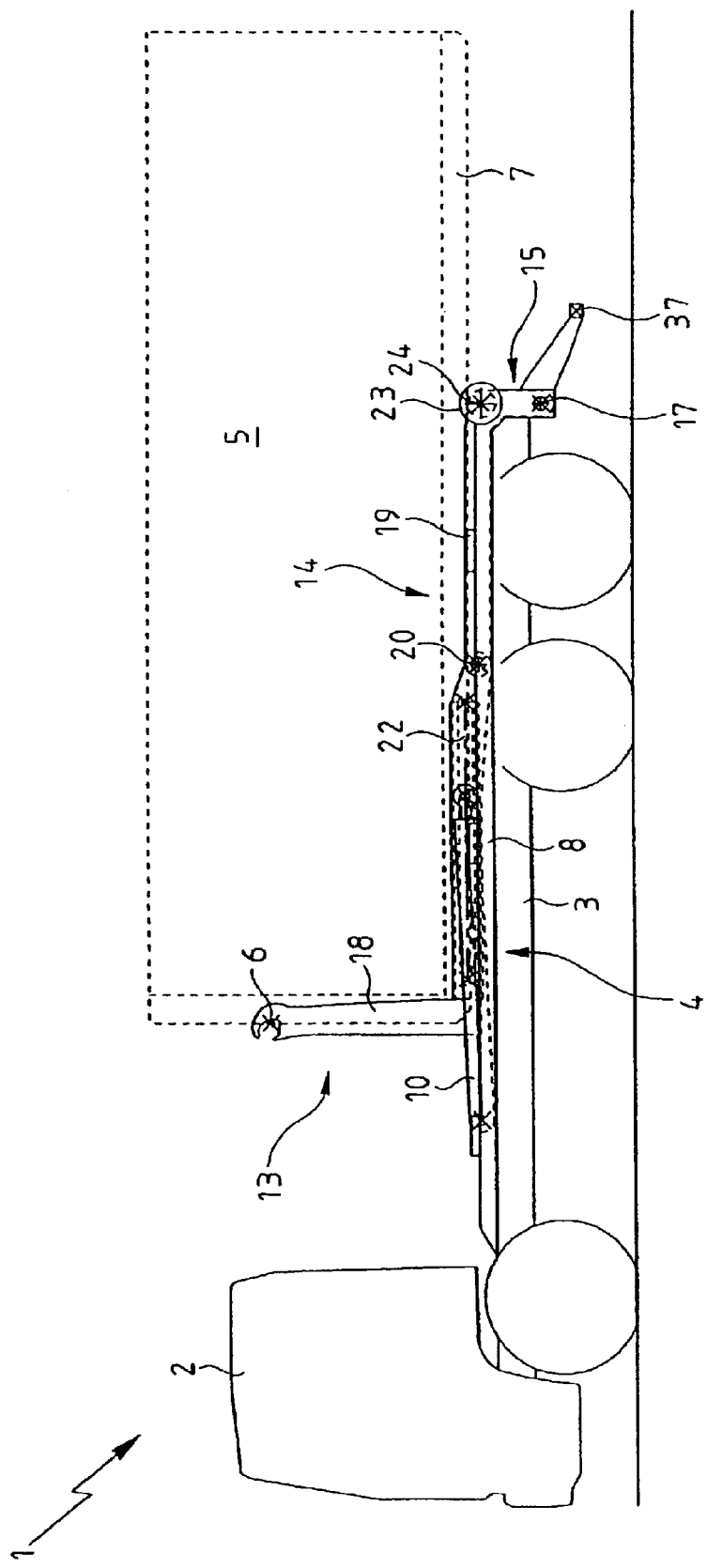
FIGS. 2 to 4 are similar views but with the equipment respectively shown in an end or start of tilting position, a putting down on the ground or picking up position, and a tipping position.
Figure 3:
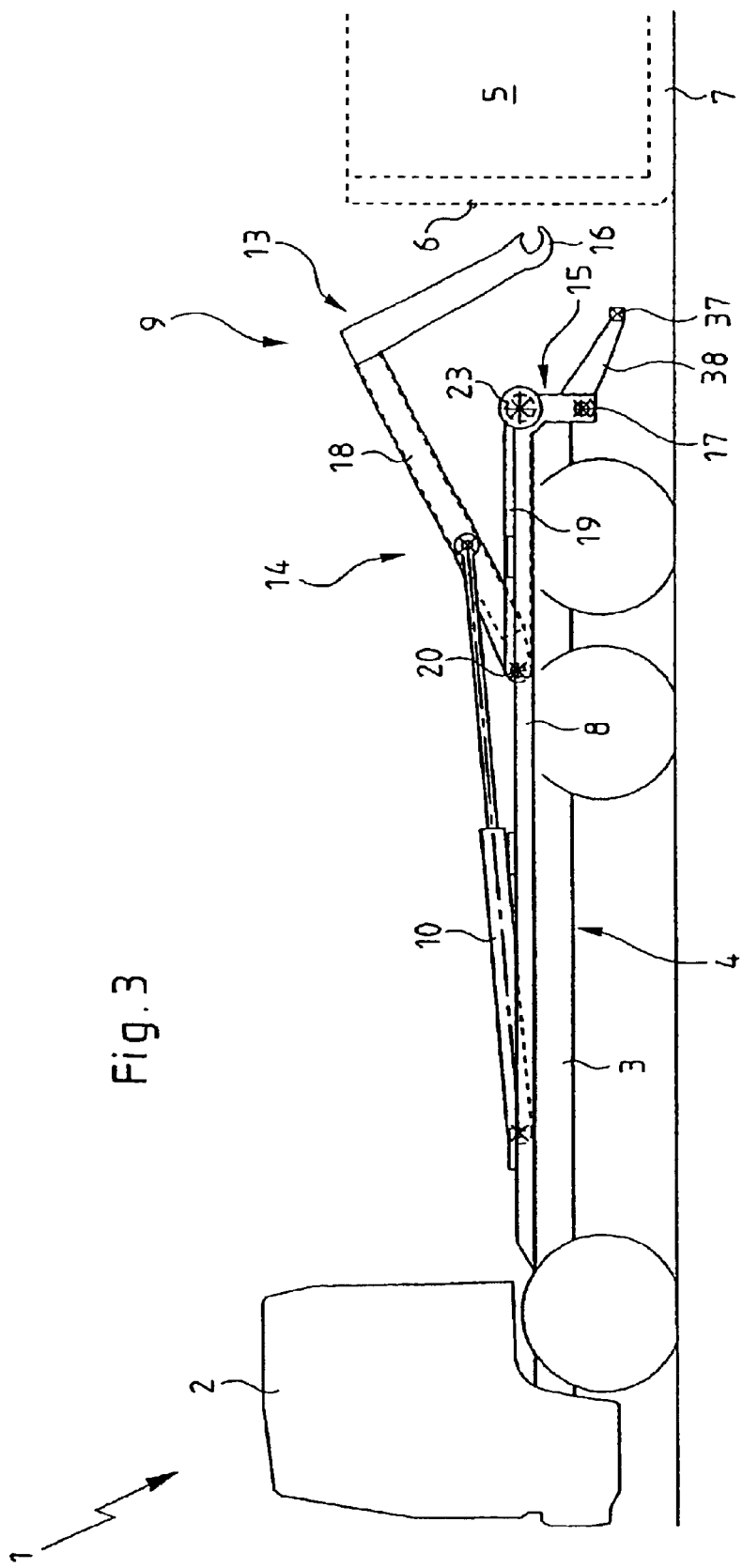

The second branch of the bracket 18 is telescopic: it has a deployed position in which its length is a maximum (see FIGS. 1 and 4) and a retracted position in which its length is a minimum (see FIGS. 2 and 3). An arm actuator 22, part of which is shown in FIGS. 1 and 2, is provided for moving the second branch of the bracket 18 from the deployed position to the retracted position and vice versa.

The link 19 has an angle-iron profile. It has a first branch which is articulated at its front end to the bracket 18 about the axis 20 and a second branch which is articulated at its base about the axis 17 and forms the rear section 15 of the arm 9.

At the junction between the two branches of the link 19, and therefore at the junction between the longitudinal section 14 and the rear section 15 of the arm 9, there are two rollers 23 (see FIG. 5) for supporting respective rails 7 of the load 5.

How the equipment 4 works is explained next.

To put a load 5 down on the ground, starting from the transport position shown in FIG. 1, the actuator 22 is operated to move the second branch of the bracket 18 from its deployed position to its retracted position, the effect of which is to move the load 5 backward relative to the vehicle 1.

When the second branch of the bracket 18 is in the retracted position, the load 5 is at the start of tilting position shown in FIG. 2. In this position the link 19 is locked to the frame 8 by means, not shown, that are well known in the art and the bracket 18 is free to pivot relative to the link 19 about the axis 20.

Putting the load 5 down on the ground continues with operation of the tilting actuator 10 to pivot the bracket 18 about the axis 20 to the putting down on the ground position shown in FIG. 3.

During the movement between the start of tilting position (FIG. 2) and the putting down on the ground position (FIG. 3), the load 5 tilts upwardly and rearwardly as it pivots about the articulation axis 24 of the rollers 23 until the edge of the load 5 where its bottom face and its rear face meet encounters the ground, after which the load is progressively lowered until the whole of its bottom face rests on the ground, enabling the hook 16 to disengage from the bar 6.

To pick up a load 5 from the ground, exactly the same maneuvers are performed in the reverse order: the actuator 10 is operated to engage the hook 16 with the bar 6 and then to raise the load 5 forwardly and upwardly at the same time as moving it forward relative to the vehicle 1 (preferably by reversing the vehicle toward the load, the latter remaining fixed with respect to the ground), until the rails 7 encounter the rollers 23, after which the load 5 levels out as it continues to move forward relative to the vehicle, into the end of tilting position (FIG. 2), at which time the actuator 22 is operated to move the load to the transport position (FIG. 1).

In this position, the means which couple the link 19 to the frame 8 are released and the bracket 18 is locked to the link 19 by means that are well known in the art, so that these latter two members cannot pivot relative to each other about the axis 20 and form a rigid assembly.

To move the load from the transport position (FIG. 1) to the tipping position (FIG. 4), the actuator 10 is operated to pivot the arm 9, and in particular the hook 16, and consequently the load 5, about the axis 17. By tilting it in this way, the load 5 can be tipped behind the vehicle 1, after opening its rear door(s).

The equipment 4 is described in more detail next.

The frame 8 of the equipment has an L-shaped profile with a first branch disposed on the load-carrying chassis frame 3 of the vehicle 1 and a second branch projecting downward from the first branch and having at its bottom means for articulating the arm 9 about the axis 17.

The first branch of the frame 8 is formed by two side members 25 disposed above respective side members 26 of the chassis frame 3, cross members (not shown) between the side members 25 connecting them together.

The second branch of the frame 8 is formed by two legs 28 connected transversely to the rear of the respective side members 25.

The link 19, which has an angle-iron profile, is disposed between the side member 25 and the legs 28 of the frame 8.

Figure 5:
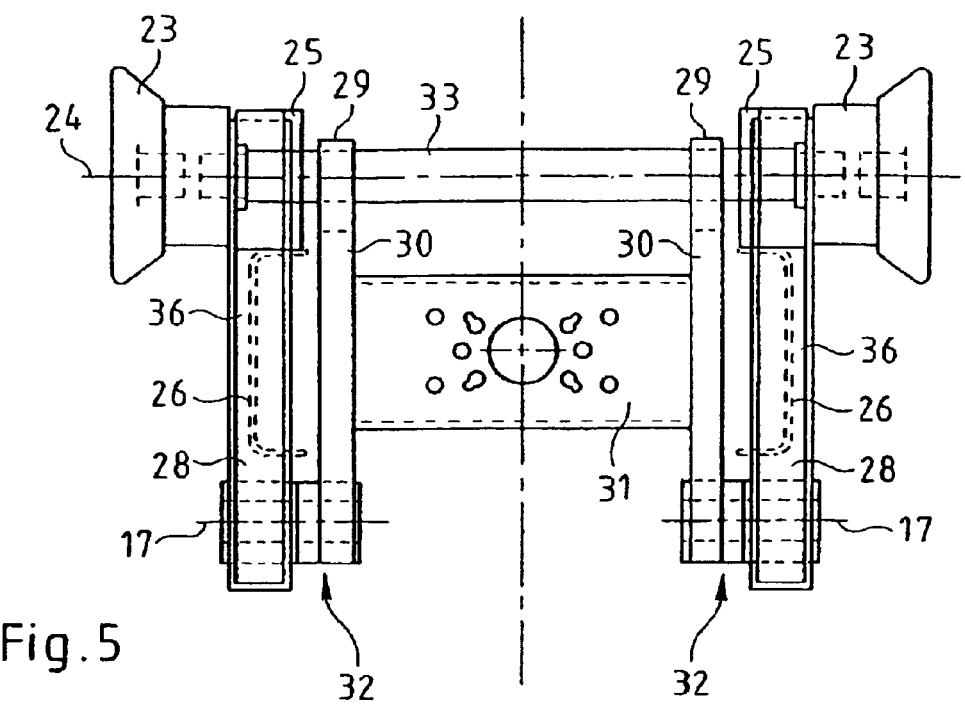
FIG. 5 is an elevation view of the equipment according to the invention as seen from the rear of the vehicle.
Figure 6:
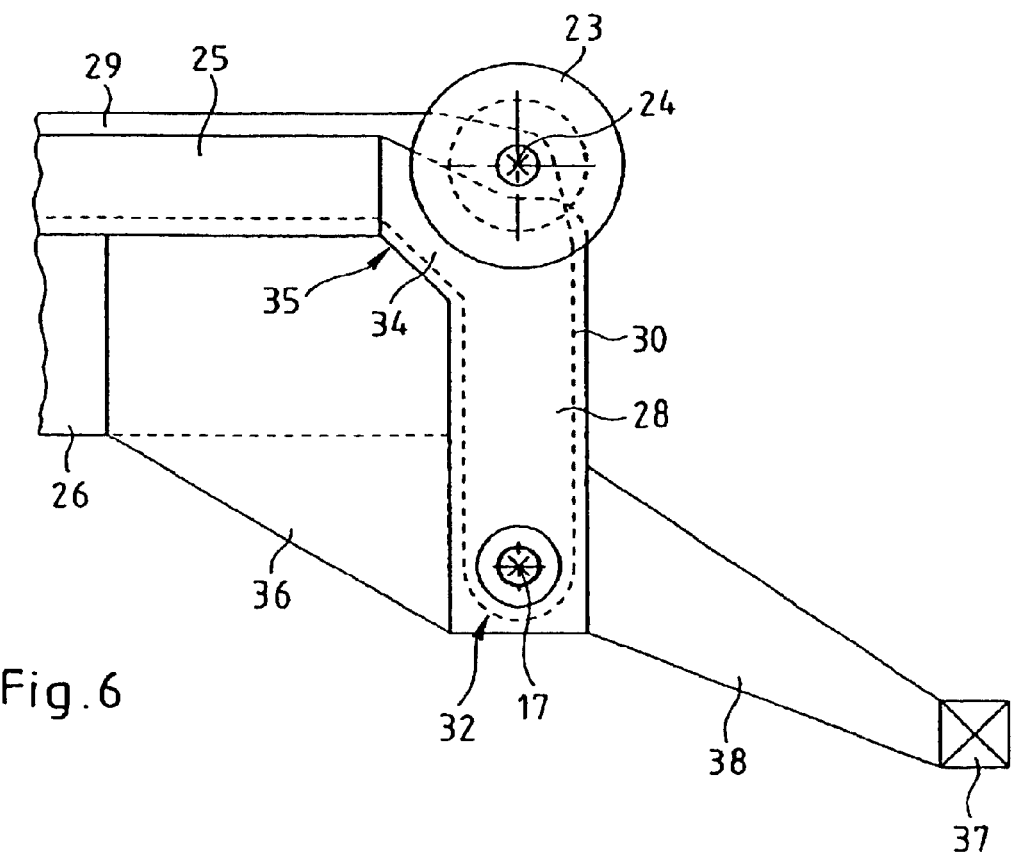
FIG. 6 is a view similar to FIG. 1 but showing only the rear portion of the equipment, to a larger scale.

The branch of the link that is part of the longitudinal section 14 of the arm 9 includes two side members 29 and the second branch of the link is formed by two legs 30 connected transversely to the rear of the respective side members 29, a cross member 31, shown only in FIG. 5, being disposed between the legs 30.

The frame 8 is articulated to the link 19 about the axis 17 by articulation means 32 at the base of and between the legs 28 and 30.

At the junction between the side members 29 and the legs 30, the link 9 carries a transverse underride guard 33 which extends outward beyond the frame 8, the rollers 23 being mounted at the ends of the underride guard 33.

Figure 9:
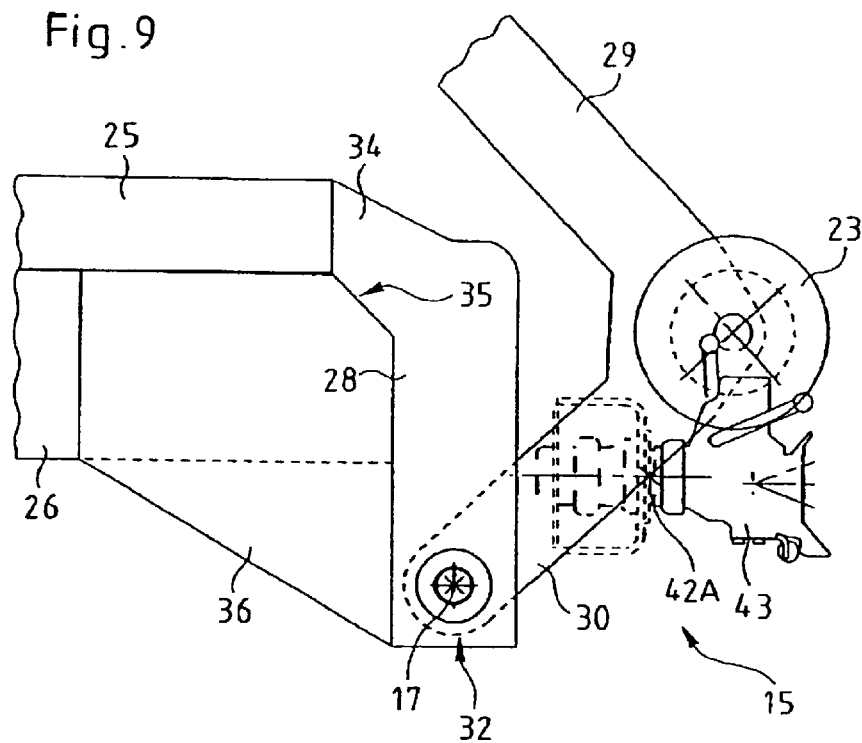
FIG. 9 is a view similar to FIG. 8, but showing the equipment in the tipping position.

As can be seen better in FIG. 9, the junction area 34 between the side members and the legs 28 is inclined downwardly and rearwardly so that a space is provided enabling the underride guard 33 to be placed to the rear of the side members 25 and above the legs 28.

As can also be seen in FIG. 9 in particular, the side members 25 are on top of the side members 26, against which they are exactly positioned, and the upper portion of the legs 28 is against the edge surface of the side members 26, the edge between the top surface and the rear (edge) surface of the side members 26 being softened by a chamfer 35 to accommodate the inclined junction 34.

On each side, a angle-bracket 36 (not shown in FIGS. 1 to 4) is disposed between the side member 25 and the leg 28 to strengthen the connection between them. It is also used to fix the frame 8, each angle-bracket 36 being fixed to the lateral wall of the corresponding side member 26 by means that are not shown.

In the embodiment shown in FIGS. 1 to 6, the second branch of the frame 8, here formed by the legs 28, carries an underride guard 37 (not shown in FIG. 5) conventionally intended, in the manner of a bumper, to prevent an automobile that is lower than the vehicle 1 running from behind under the portion of the load 5 that is cantilevered relative to the vehicle 1.

The underride guard 37 and the legs 28 that support it are connected by two angle-brackets 38.

It can be seen that, in the transport position (FIG. 1), the distance between the rear of the load 5 and the underride guard 37 is particularly small, which is very beneficial in terms of safety, and that despite this small distance the load 5 can move from the transport position to the tipping position (FIG. 4) without encountering the underride guard 37.

Because of the distance between the axis 24 and the axis 17, more generally between the axis 17 and the longitudinal section 14 of the arm 9, this section, on moving between the transport position and the tipping position, is offset toward the rear and slightly downward, as is therefore the load 5 also.

Another factor which is beneficial in terms of this disposition of the underride guard 37 is that the axis 17 is to the rear of the chassis frame 3.

Note also that the downward distance between the longitudinal section 14 and the axis 17 enables the actuator 10, when in the transport position (FIG. 1), to have a large lever arm with respect to the axis 17, even though it is very slightly inclined to the horizontal; the lever arm is much greater than if the arm 9 were articulated to the rear of the section 14 above the side members 26 of the chassis frame 3.

Figure 7:
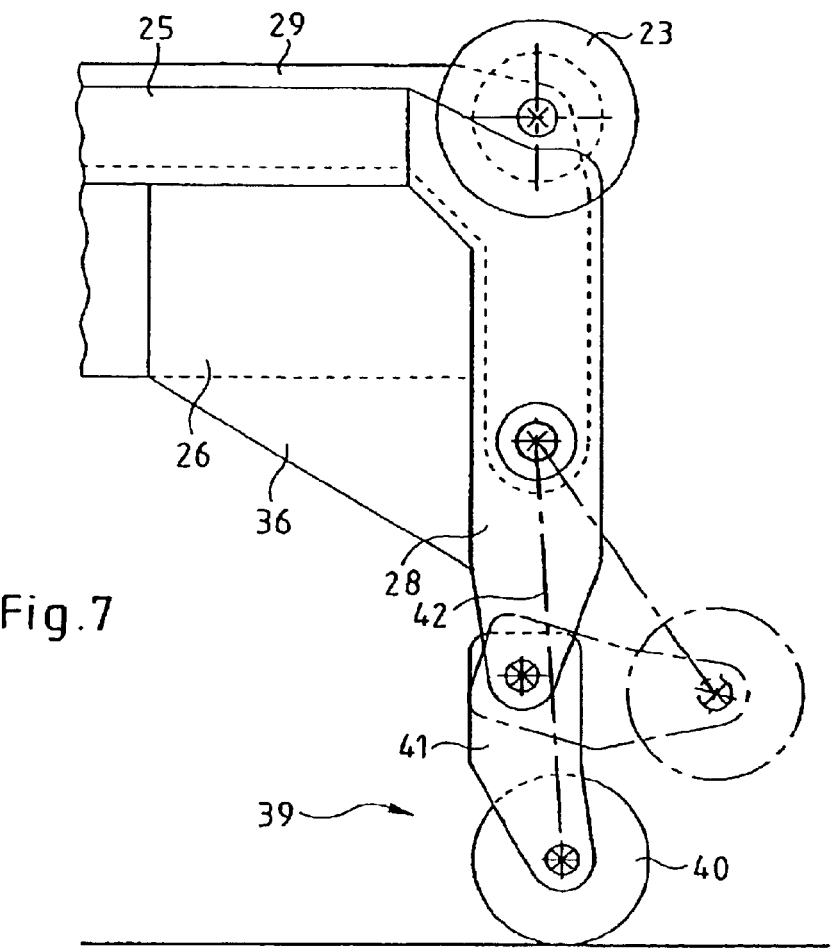
FIG. 7 is a view similar to FIG. 6 showing an embodiment in which the equipment includes a rear strut which comes into contact with the ground.

In the embodiment shown in FIG. 7, the legs 28 of the frame 8 are not supported on an underride guard 37, but on a strut 39 which comes into contact with the ground and consists of a roller 40 that comes into contact with the ground, two links 41 each articulated at one end to the roller 40 and at the other end to one of the legs 28, and an actuator 42, symbolized by a chain-dotted line, for moving the strut 39 from its working position, shown in full line, to its retracted position, shown in chain-dotted line.

An embodiment that is not shown includes an underride guard 37 and a strut 39 which comes into contact with the ground.

Figure 8:
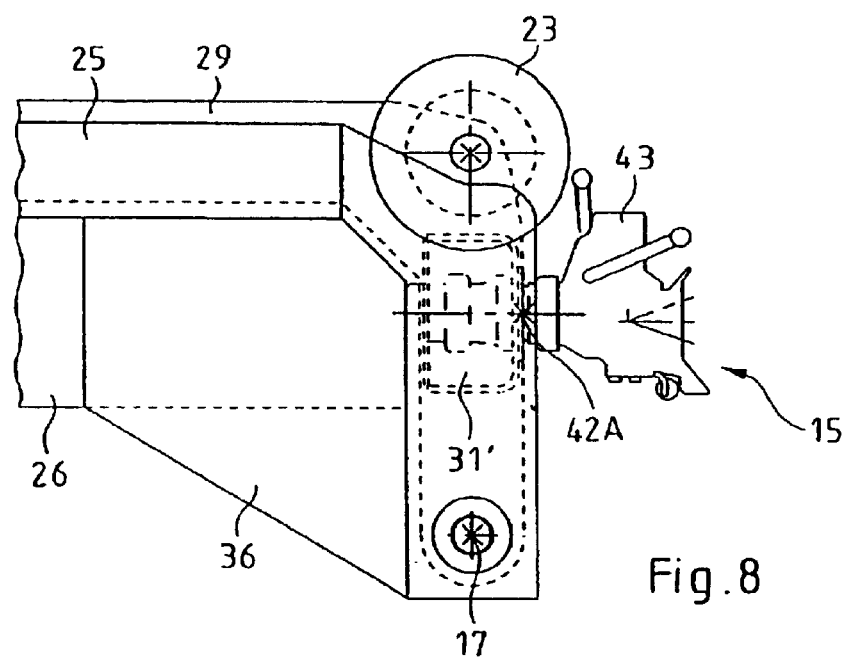
FIG. 8 is a view similar to FIG. 6 showing another embodiment in which the equipment is equipped with a towing hook.

In the embodiment shown in FIGS. 8 and 9, the cross member 31 is replaced by a cross member 31' articulated about a transverse pivot axis 42A and the cross member 31' carries a towing hook 43.

Because the cross member 31' is mounted around the axis 42A, the equipment 4 can be moved to the tipping position (FIG. 4) without having to break the connection between the towbar of the trailer and the hook 43, the link 19 being able to pivot about the axis 17 while the hook 43 remains horizontal, as shown in FIG. 9.

An embodiment that is not shown includes a hook mounted on an articulated cross member, a strut which comes into contact with the ground and/or an underride guard 37.

Figure 10:
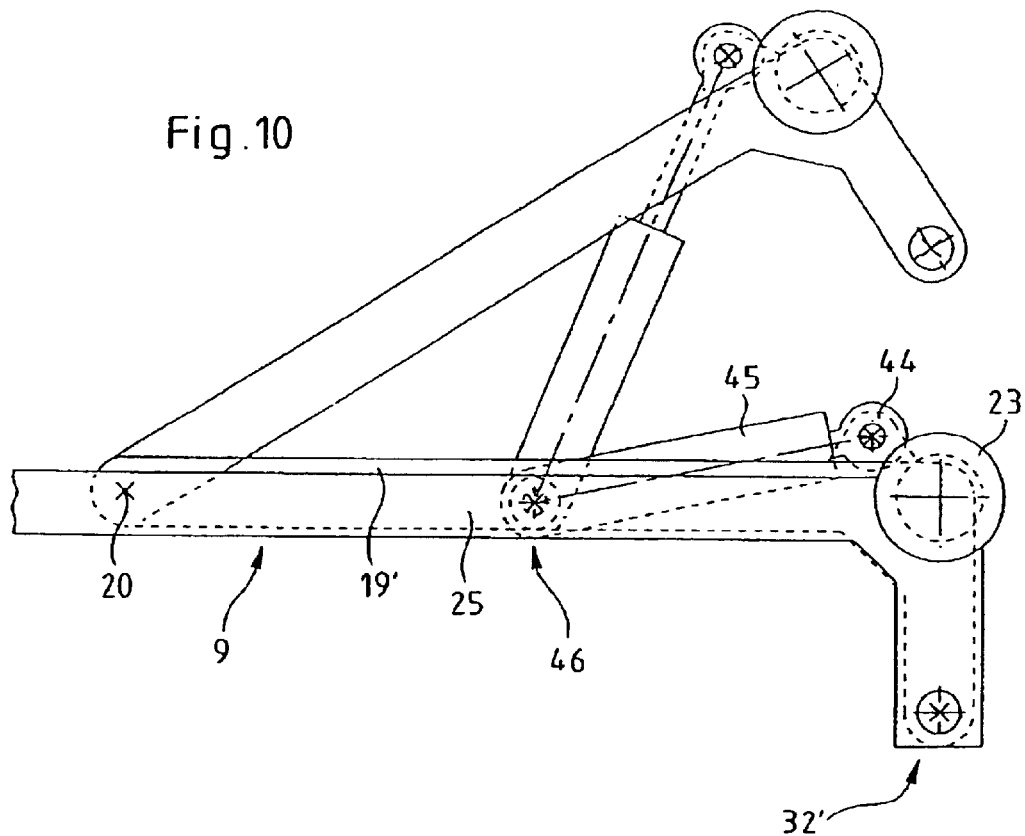
FIG. 10 is a view similar to FIG. 6, showing another embodiment in which the link of the handling arm can be used to raise the rear of a load.

In the embodiment shown in FIG. 10, the means 32 providing a permanent rotational coupling between the arm 9 and the frame 8 about the axis 17 are replaced by means 32' for locking and releasing the rotational coupling at will. Also, the link 19 is replaced by a link 19' which is similar to the link 19 but further includes, at the junction between the two branches, a supplementary cross member 44 to which is articulated one end of a lifting actuator 45 whose other end is articulated to a supplementary cross member 46 disposed between the side members 25 of the frame 8.

In normal operation, as shown in FIGS. 1 to 4, the coupling means 32' are locked and the actuator 45 is passive, i.e. its piston rod is free to move relative to its body, thanks to a double-acting distributor whose rest position establishes communication between the two chambers of the actuator 45.

If, starting from the start or end of tilting position (FIG. 2), it is required to lift the rear of a load, the rotational coupling means 32' are released and the actuator 45 is then operated by the abovementioned distributor and assumes its deployed position (rod deployed), the effect of which is to pivot the link 19' upward and to the rear about the axis 20, i.e. toward the position shown at the top in FIG. 10 (the portion of this figure with no reference numbers).

It is therefore a particularly simple matter to stand a load on end at a height greater than that which it has in the transport position, in particular a dumpster for agricultural use which fills from its bottom a tractor trailer disposed under the load when put on end.

Of course, after raising the rear of a load of this kind with the link 19', the rear feet of the load are put into place. The front of a load of this kind is raised by the bracket 18 and the tilting actuator 20.

In the maneuvers that have just been described, the articulation means operative about the axis 20 are immobilized relative to the frame 10, as in maneuvers between the start or end of tilting position (FIG. 2) and the putting on the ground or picking up position (FIG. 3).

An embodiment that is not shown includes a link 19' that can be raised, as shown in FIG. 10, a strut which comes into contact with the ground, and/or an underride guard.

In an embodiment that is not shown, the transverse rear articulation axis of the handling arm is spaced downwardly from the longitudinal section of the arm, but to the rear of the chassis frame, for example just at the level of its rear end, by having the legs 28 disposed laterally relative to the rear end of the side members 26, rather than behind the side members; as an alternative to this, the legs 28 can be disposed at a distance to the rear of the side members of the chassis frame, the transverse rear pivot axis then being at a relatively great distance to the rear of the chassis frame.

In other embodiments that are not shown the telescopic bracket 18 is replaced by a different type of telescopic or non-telescopic bracket, in particular a bracket of the type described in U.S. Pat. No. 3,878,948 or in patent application FR 2 169 810 A.

Other embodiments that are not shown include two tilting actuators disposed side by side (rather than only one), and the vehicle, rather than being a truck with a load-bearing chassis frame, is a semi-trailer.

Many other embodiments can be envisaged as a function of different circumstances, and in this connection it is as well to remember that the invention is not limited to the examples described and shown.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed:

1. Equipment enabling a vehicle to put down on the ground or to pick up a load such as a dumpster and to tip said load, which has a lifting bar on a front face, said equipment including a deformable and tilting handling arm provided at one end with a hook adapted to interengage with said lifting bar of said load and adapted to assume the following positions:
- a transport position in which a front section of the handling arm is disposed at the front end of said equipment and oriented vertically or substantially vertically with said hook at the top and a longitudinal section of the handling arm is disposed to the rear of said front section and oriented horizontally or substantially horizontally with the front end of said longitudinal section connected to a base of said front section;
- a putting down on the ground or picking up position in which said hook is to the rear of said vehicle at a height enabling it to be interengaged with or released from said lifting bar of said load resting on the ground;
- a tipping position to which said hook moves from said transport position by being pivoting upwardly and rearwardly by a tilting actuator about a transverse pivot axis situated to the rear of said equipment, in which equipment said transverse rear pivot axis is downwardly spaced from said longitudinal section of said handling arm;
- a frame; and
- an underride guard that projects rearwardly from the frame without being an obstacle to the dumpster when the dumpster moves from the transport position to the tipping position.

2. The equipment claimed in claim 1 wherein said handling arm has a rear section which, in said transport position, is disposed to the rear of said longitudinal section and oriented vertically or substantially vertically with the top of said rear section connected to the rear of said longitudinal section, means for articulation of said arm about said transverse rear pivot axis being disposed at the base of said rear section.

3. The equipment claimed in claim 2 wherein said handling arm has at the junction between said longitudinal section and said rear section two rollers adapted to support respective longitudinal rails situated on a righthand side and a lefthand side of a bottom face of said load.

4. The equipment claimed in claim 1 wherein said handling arm includes a link with an angle-iron profile, the link including a first branch which belongs to said longitudinal section and a second branch which is articulated at its base about said transverse rear pivot axis.

5. The equipment claimed in claim 4 wherein said link includes two side members and a leg connected transversely to the rear of each side member.

6. The equipment claimed in claim 4 wherein said handling arm includes a bracket which has a first branch which forms said front section and a second branch which belongs to said longitudinal section, said second branch of said bracket being articulated to the front end of said link opposite said front section.

7. The equipment claimed in claim 4 wherein articulation means of said link about said transverse rear pivot axis are releasable.

8. The equipment claimed in claim 1 wherein said handling arm includes a bracket which has a first arm which forms said front section and a second branch which belongs to said longitudinal section and is telescopic.

9. The equipment claimed in claim 1 wherein the frame having an L-shaped profile, a first branch of which is adapted to come onto said chassis frame of said vehicle and whose second branch projects downward from said first branch and includes means for articulating said handling arm about said transverse rear pivot axis.

10. The equipment claimed in claim 9 including a downwardly and rearwardly inclined portion at the junction between said first and second branches of said frame.

11. The equipment claimed in claim 9 wherein said frame includes two side members and a leg transversely connected to the rear of each side member.

12. The equipment claimed in claim 9 wherein the underride guard is carried by said second branch of said frame.

13. The equipment claimed in claim 12, wherein the underride guard are secured to said second branch of said frame by angle brackets.

14. The equipment claimed in claim 9 including a rear strut adapted to come into contact with the ground and carried by said second branch of said frame.

15. A vehicle equipped with equipment as claimed in claim 9 wherein said first branch of said frame is on top of said side members of said chassis frame of said vehicle and an upper portion of said second branch is against the rear of said side members of said chassis frame.

16. The vehicle claimed in claim 15 wherein there is a chamfer between an upper face and a rear face of said side members, said chamfer being flanked by a junction between said branches of said frame.

17. The vehicle claimed in claim 15 wherein an angle-bracket disposed between a side member and a leg of said frame is fixed to a lateral wall of a side member of said chassis frame of said vehicle.

18. Equipment enabling a vehicle to put down on the ground or to pick up a load such as a dumpster and to tip said load, which has a lifting bar on a front face, said equipment including a deformable and tilting handling arm provided at one end with a hook adapted to interengage with said lifting bar of said load and adapted to assume the following positions:
- a transport position in which a front section of the handling arm is disposed at the front end of said equipment and oriented vertically or substantially vertically with said hook at the top and a longitudinal section of the handling arm is disposed to the rear of said front section and oriented horizontally or substantially horizontally with the front end of said longitudinal section connected to a base of said front section;
- a putting down on the ground or picking up position in which said hook is to the rear of said vehicle at a height enabling it to be interengaged with or released from said lifting bar of said load resting on the ground; and
- a tipping position to which said hook moves from said transport position by being pivoting upwardly and rearwardly by a tilting actuator about a transverse pivot axis situated to the rear of said equipment, in which equipment said transverse rear pivot axis is downwardly spaced from said longitudinal section of said handling arm, wherein said handling arm has a rear section which, in said transport position, is disposed to the rear of said longitudinal section and oriented vertically or substantially vertically with the top of said rear section connected to the rear of said longitudinal section, means for articulation of said arm about said transverse rear pivot axis being disposed at the base of said rear section, and wherein said rear section of said handling arm is provided with a towing hook.

19. The equipment claimed in claim 18 wherein said towing hook is mounted to tilt about a transverse pivot axis.

20. Equipment enabling a vehicle to put down on the ground or to pick up a load such as a dumpster and to tip said load, which has a lifting bar on a front face, said equipment including a deformable and tilting handling arm provided at one end with a hook adapted to interengage with said lifting bar of said load and adapted to assume the following positions:

a transport position in which a front section of the handling arm is disposed at the front end of said equipment and oriented vertically or substantially vertically with said hook at the top and a longitudinal section of the handling arm is disposed to the rear of said front section and oriented horizontally or substantially horizontally with the front end of said longitudinal section connected to a base of said front section;

a putting down on the ground or picking up position in which said hook is to the rear of said vehicle at a height enabling it to be interengaged with or released from said lifting bar of said load resting on the ground; and a tipping position to which said hook moves from said transport position by being pivoting upwardly and rearwardly by a tilting actuator about a transverse pivot axis situated to the rear of said equipment, in which equipment said transverse rear pivot axis is downwardly spaced from said longitudinal section of said handling arm, wherein said handling arm includes a link with an angle-iron profile, the link including a first branch which belongs to said longitudinal section and a second branch which is articulated at its base about said transverse rear pivot axis, wherein said link includes two side members and a leg connected transversely to the rear of each side member, and wherein a cross member disposed between said legs carries a towing hook and is articulated to said legs about a transverse pivot axis.

21. A vehicle comprising equipment enabling the vehicle to put down on the ground or to pick up a load such as a dumpster and to tip said load, which has a lifting bar on a front face, said equipment including a deformable and tilting handling arm provided at one end with a hook adapted to interengage with said lifting bar of said load and adapted to assume the following positions:

a transport position in which a front section of the handling arm is disposed at the front end of said equipment and oriented vertically or substantially vertically with said hook at the top and a longitudinal section of the handling arm is disposed to the rear of said front section and oriented horizontally or substantially horizontally with the front end of said longitudinal section connected to a base of said front section;

a putting down on the ground or picking up position in which said hook is to the rear of said vehicle at a height enabling it to be interengaged with or released from said lifting bar of said load resting on the ground;

a tipping position to which said book moves from said transport position by being pivoting upwardly and rearwardly by a tilting actuator about a transverse pivot axis situated to the rear of said equipment, in which equipment said transverse rear pivot axis is downwardly spaced from said longitudinal section of said handling arm;

a frame; and an underride guard that projects rearwardly from the frame without being an obstacle to the dumpster when the dumpster moves from the transport position to the tipping position.

22. The vehicle as claimed in claim 21 wherein said transverse rear pivot axis is to the rear of and lower than side members of frame.

* * * * *